United States Patent [19]

Evans

[11] 4,177,931
[45] Dec. 11, 1979

[54] BREAKAWAY GAS CAP

[75] Inventor: John H. Evans, Connersville, Ind.

[73] Assignee: Stant Manufacturing Company, Inc., Connersville, Ind.

[21] Appl. No.: 948,424

[22] Filed: Oct. 4, 1978

[51] Int. Cl.[2] .................... B65D 41/04; B65D 41/32
[52] U.S. Cl. ............................... 220/288; 220/266; 220/256; 220/258; 220/DIG. 33
[58] Field of Search ........................ 220/256–258, 220/265, 266, 288, DIG. 33; 215/251, 253

[56] References Cited
U.S. PATENT DOCUMENTS

| 3,405,837 | 10/1968 | Carpenter, Jr. ............... 220/258 |
| 4,091,955 | 5/1978 | Sloan, Sr. .................... 220/288 X |

Primary Examiner—George T. Hall
Attorney, Agent, or Firm—Jenkins, Coffey, Hyland, Badger & Conard

[57] ABSTRACT

A break-away gas cap includes an inner member having a central portion adapted to close and seal an opening in gasoline tanks, such as the gasoline fill neck of an automobile, and an outer shell that engages and is carried by the inner member and provides a hand-engaging surface to be used to insert and remove the gas cap. The inner member includes weakened portions between its closure portion and the portions carrying the outer shell to enhance breakage of the outer shell from the inner member in the event of impact, such as an automobile accident, without affecting the closure and seal of the gasoline tank.

12 Claims, 4 Drawing Figures

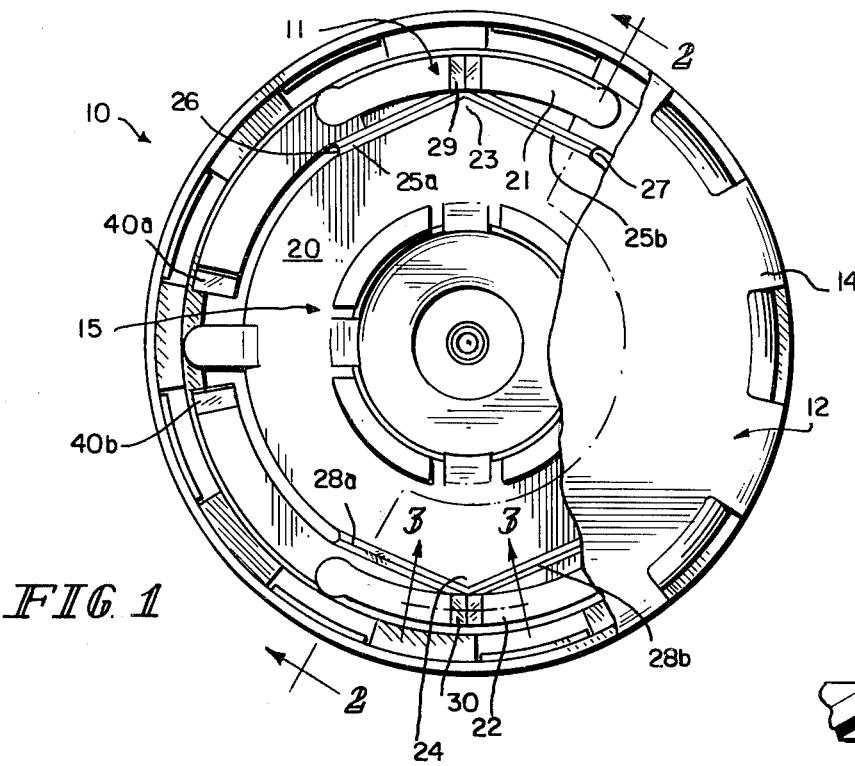
FIG. 1
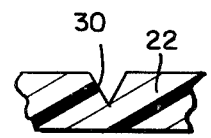
FIG. 3
FIG. 1a
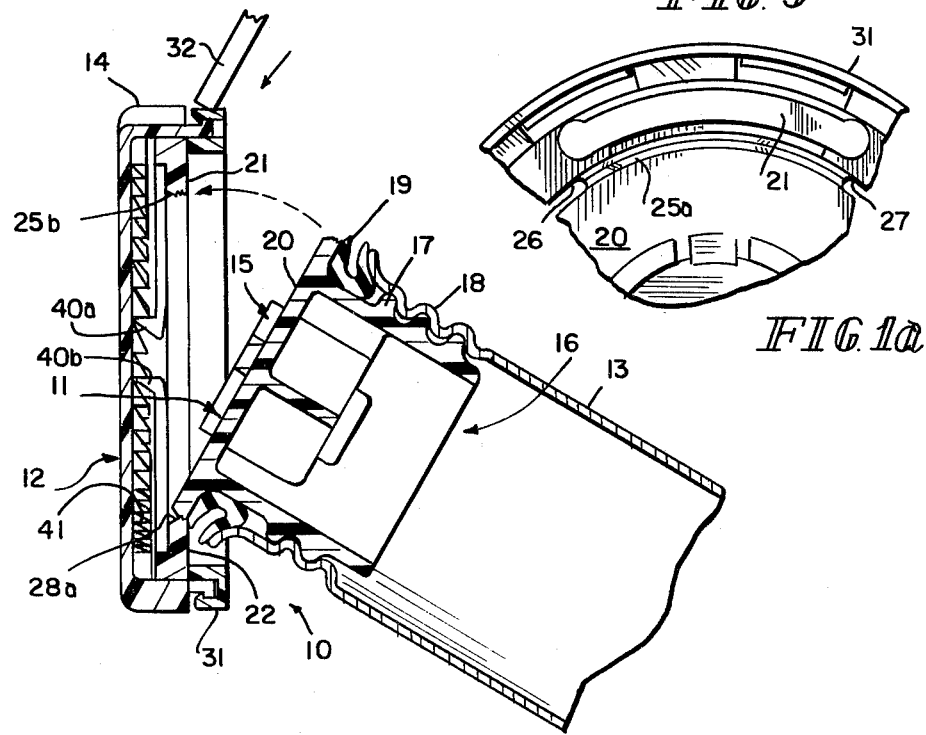
FIG. 2

BREAKAWAY GAS CAP

This invention relates to gas caps and particularly to gas caps adapted to close and seal the gasoline fill neck of an automobile.

U.S. Pat. Nos. 4,000,632 issued Jan. 4, 1977, 3,985,260 issued Oct. 12, 1976, and 3,831,801 issued Oct. 27, 1974 all disclose filler caps having molded plastic threaded neck end closures and formed metallic or molded plastic outer shell portions crimped or snapped to the closure portions. None of the disclosed gasoline caps, however, are specifically adapted to maintain closure of the gasoline tank in the event that the gas cap receives an impact of sufficient intensity to break it, for example as may occur in an automobile accident. U.S. Pat. No. 3,856,316 is directed to a fuel tank filler neck assembly that is attached to a plurality of tabs in the sheet metal portion of the automobile and is provided with fasteners that remain captive in the assembly in the event the sheet metal mounting tabs are ripped away from the fuel tank filler neck assembly. U.S. Pat. No. 3,856,316 does not disclose, however, means to provide a closure of the filler neck assembly that remains within the filler neck in the event of breakage of the cap, or means to permit its outer cap portion to be broken away from the filler neck assembly as a result of impact while maintaining the closure and sealing of the filler neck tube.

This invention constitutes an improvement over prior art devices by providing a gasoline cap which will break upon impact of its outer portion without the breakage affecting the integrity of that portion of the gas cap which closes the gasoline tank. In accordance with the invention, the gasoline cap includes an inner portion forming a closure in its central portion carried within the gas filler opening and an outer portion or shell adapted to be gripped to permit the removal of the inner portion from the gas fill opening. The inner portion includes a weakened or frangible section between the closure and the outer portion that is located to permit the outer portion to break away from the closure without breaking the closure or affecting the seal of the gas fill opening. The inner portion may be manufactured with a projecting portion or cantilevered peripheral portion to carry the outer portion, and to be broken away at the frangible section in the event of an impact upon the outer portion. Peripheral portions cantilevered from an axially depending portion may be used to carry the outer portion or shell, and webs supporting the cantilevered peripheral portions may provide the frangible section. V-shaped grooves, or grooves having other cross-sections, may be added to the webs to weaken and enhance the ability of the outer portion to be broken away from the gas cap without breaking the axially depending portion or interferring with its seal of the fuel tank filler neck.

Further features and advantages of the invention may be understood by referring to the following description and drawings in which:

FIGS. 1 and 1a are vertical views partially broken away and fragmented, respectively, to show the inner member of the cap;

FIG. 2 is a cross-sectional view of a cap of this invention taken along section lines 2—2 of FIG. 1 and diagrammatically showing the manner in which the outer shell breaks away from the inner member; and FIG. 3 is a partial cross-sectional view taken along section lines 3—3 of FIG. 1 and showing a frangible section of the cap.

Referring now to the drawings, and particularly to FIGS. 1 and 2, a gas cap 10 of this invention includes an inner portion such as inner member 11 and an outer portion such as outer shell 12. The inner portion 11 forms a closure for the opening to a gasoline tank and, as shown, is used to close a gasoline fill neck 13 of an automobile. The outer shell portion 12 provides surface 14 to be gripped by the user in inserting and in removing the inner member 11 from the opening of the gasoline fuel tank.

The central portion 15 of the inner member 11 provides the closure and may include an axially depending portion to engage and seal the fuel tank filler neck of an automobile. As shown in FIG. 2, the axially depending portion 16 of the inner member 11 may include threads 17 to engage corresponding threads 18 in the gasoline filler neck tube 13 and may carry a seal 19 in the form of a pliant rubber O-ring. As shown in FIG. 1 and FIG. 2, the upper portion of the inner member 11 may also include a disk-like central portion 20.

The outer shell 12 is attached to the inner member 11 in such a manner that weakened sections are provided between the central portion of the inner member that closes the opening to the gasoline tank and the means of attachment of the outer shell. The inner member 11 may be provided with a plurality of projecting portions 21 and 22. The projecting portions 21 and 22 may be cantilevered from the axially depending portion 16 of the inner member and from its disk-like upper portion 20 as shown in FIG. 2. The webs 23 and 24 connecting projections 21 and 22 to the central portion of the inner member may provide frangible sections to enhance the ability of the outer shell to be broken away from the inner members. By providing the webs 23 and 24 with grooves reducing the thickness of the webs and providing sites for stress concentration along their length, the breakability of the webs may be enhanced. Where the means attaching the outer shell to the inner member are cantilevered peripheral projections 21 and 22, the frangible sections may preferably be formed by straight V-shaped grooves crossing the web connecting the cantilevered peripheral portions with the central portion of the inner member. As shown in FIG. 1, for example, the web 23 between the central portion 15 of the inner member and the cantilevered peripheral portion 21 may be provided with two straight V-shaped grooves 25a and 25b leading from the edges 26 and 27 of the web 23 and intersecting adjacent the center of the cantilevered peripheral portion 21. The web 24 between the inner member 11 and the cantilevered peripheral projecting portion 22 may likewise be weakened by providing it in the same manner with two straight intersecting V-shaped grooves 28a and 28b as also shown in FIG. 1. In addition, to enhance the controlled breakability of the outer shell 12 from the gas cap, projections 21 and 22 may be provided with V-shaped grooves 29 and 30 respectively adjacent their centers. FIG. 3 is a cross-sectional view of projecting portion 22 showing a V-shaped groove 30 provided therein.

As shown in FIG. 2, the outer shell 12 is attached to the inner member 11 at the projecting portions 21 and 22 by means of a snap-on clamp 31. When the outer shell 12 receives an impact as, for example, may occur from the sheet metal 32 of an automobile and as diagrammatically indicated in FIG. 2, the frangible weakened section of the inner member 11 can fracture without breaking the central portion of the inner member forming the gasoline tank closure. As shown in FIG. 2, an impact to the outer shell 12 from sheet metal 32 will break the webs between the central portion 15 of the inner member and the projections 21 and 22 to which the outer shell 12 is attached, specifically at the V-shaped grooves 25a and 25b and at the V-shaped grooves 28a and 28b in the central portion of the inner member. As a result of the facture of the inner member adjacent V-shaped grooves 25a and 25b, 28a and 28b and frequently the fracture of projections 21 and 22 at V-shaped grooves 29 and 30, the inner member 11 does not break along its axially depending portion 16, and the seal 19 and threads 17 remain intact and effective and closing and sealing the gasoline filler neck 13.

The invention is particularly adaptable to gas caps having an inner member with a threaded closure that is molded from plastic and has a separate outer shell engaging and carried by the inner member to rotate the inner member in one direction, but providing slip in the event the rotational torque exceeds a predetermined level in that direction, while capable of rotating the inner member in the other direction without slip. Such a cap can be used to close an automobile gasoline filler neck without overtightening of the threaded closure.

In such a gas cap, the plastic inner member 11 is provided with plural pawl fingers 40a and 40b which are supported from cantilevered peripheral portions 21 and 22 and which extend generally concentrically about the central axis of the closure. The outer shell 12 includes means 41 forming a ratch concentric with the central axis of the closure. Such means may be a plurality of concentrically arranged teeth or indents in the outer shell. When the outer shell 12 is fastened to the inner member 11, for example by member 31, the plural pawl fingers 40a and 40b engage the ratch means 41 so that the outer shell 12 may be used to rotate the inner member 11 to insert it and remove it from the gasoline fill neck. The plural pawl fingers are provided with a ramp profile, in a manner that is known in the art, and the resiliency of the plastic material in the elongated pawl fingers permits only limited torque to be applied to the inner member 11 by the outer shell 12 in one direction.

Where the inner member 11 is molded plastic, it is preferable to provide the V-shaped grooves in the upper surface of the inner member in order to make the inner member easier to mold. Furthermore, where the inner member 11 is molded by injecting plastic material into its central portion for flow outwardly to projecting portions, location of V-shaped grooves across the flow lines of the plastic during molding is advisable. Grooves forming a sharp fillet, such as the V-shaped groove, are preferable because, in addition to being easy to mold, such grooves concentrate the stress lines at the sharp fillets and enhance the breakability of the part along the lines of highest stress.

This invention can provide a gasoline cap which will reduce the likelihood of gasoline spillage in the event of an accident.

While the preferred embodiment of my invention was shown and described, it is to be understood that it is capable of modification and changes in the construction and arrangement may be made without departing from the spirit and scope of my invention as disclosed in the claims. For instance, instead of V-shaped grooves, grooves having various cross-sectional shapes and configurations may be used to provide predetermined stress concentrations at desired locations. While it may be preferable, for molding purposes, to have the grooves in the upper surface of the inner member, it will be appreciated that the grooves may be placed in the lower surface. FIG. 1a shows a possible modification in which one generally circular groove 25a is used instead of the straight grooves 25a, 25b of FIG. 1. In the FIG. 1a structure, a similar generally circular groove would replace the two straight grooves 28a, 28b also shown in FIG. 1. Further, the concept of providing a predetermined frangible section is applicable to caps having metal or plastic outer shells 12 and metal or plastic retaining members 31.

I claim:

1. A cap for an automobile fuel fill neck, comprising an inner portion having a central portion adapted to close and seal the neck and having peripheral portions, an outer portion carried by said peripheral portions and providing a hand engaging surface to be used to insert and remove the central portion from the neck, said inner portion including a frangible section defined between the central portion and the peripheral portions to enhance breakage of the gas cap without affecting the closure and sealing of the neck.

2. The gas cap of claim 1 wherein the peripheral portions of the inner portion are cantilevered by webs from the central portion and grooves are provided across the webs between the central portion and the cantilevered peripheral portions.

3. The gas cap of claim 2 wherein the grooves are two straight V-shaped grooves beginning at the edges of the webs and intersecting adjacent the centers of the cantilevered peripheral portions.

4. The gas cap of claims 2 or 3 wherein the peripheral portions are provided with V-shaped grooves across their centers.

5. A gas cap comprising a molded plastic closure having an axially depending portion threaded about its central axis to engage an automobile fuel fill neck and a disk-like upper portion having cantilevered peripheral edge portions and plural pawl fingers extending generally concentrically about the central axis of the closure and supported from the upper portion by the cantilevered peripheral portions, an outer shell rotatably carried by said closure on said cantilevered peripheral edge portions, said outer shell including means forming a ratch concentric with the central axis of the closure and adapted to be engaged by the plural pawl fingers of the closure permitting the outer shell to rotate the closure in one direction, and providing slip in the event the rotational torque in said one direction exceeds a predetermined level, and permitting the outer shell to rotate the closure in the other direction without slip, said closure forming two straight intersecting V-shaped grooves between each of the cantilevered peripheral portions and the disk-like upper portion of the closure, and a radially extending, V-shaped groove in the central portion of each of the cantilevered peripheral portions and intersecting the two adjacent straight intersecting V-shaped grooves whereby an impact on the outer shell will fracture the disk-like upper portion of the closure leaving the closure in the fill neck.

6. A gas cap for a filler neck opening comprising an inner portion forming a closure carried within the opening and an outer portion adapted to be gripped and to permit removal of the inner portion from the opening, said gas cap including a frangible section between said closure and said outer portion located to fracture without breaking the closure.

7. The cap of claim 6 wherein the outer portion and the inner portion of the gas cap are separate members, and the outer portion forms an outer shell attached to the inner member by means of attachment including a plurality of projections from the inner member, said plurality of projections forming said frangible section.

8. The cap of claim 6 or 7 wherein the central section of the inner member includes a threaded axially depending closure and carries a seal, and said plurality of projections includes peripheral portions cantilevered from the central section of the inner member by webs forming said frangible sections.

9. The cap of claim 8 wherein the webs and cantilevered peripheral portions are provided with V-shaped grooves to enhance the breakability of the gas cap at the V-shaped grooves.

10. The cap of claim 9 wherein the frangible sections include two straight, intersecting V-shaped grooves from the edges of the web and intersecting at the center of each peripheral portion and a V-shaped groove radially across each peripheral portion from its exterior edge to the intersection of the two straight, intersecting V-shaped grooves.

11. The gas cap of claim 6 wherein the outer portion and the inner portion are separate members, and the outer portion forms an outer shell attached to the inner member by a web of the inner member that is weakened by grooves reducing the cross sectional area of the web and providing a site of stress concentration.

12. The gas cap of claim 11 wherein the web supports a projecting portion of the inner member to which the outer shell is attached and is crossed by straight V-shaped grooves.

* * * * *